No. 685,174. Patented Oct. 22, 1901.
C. RENARD.
WHEEL FOR ROAD VEHICLES.
(Application filed Mar. 5, 1901.)
(No Model.)

Witnesses:
Paul Hunter
J. B. Owens

Inventor
Charles Renard
By Munn
Attorneys

UNITED STATES PATENT OFFICE.

CHARLES RENARD, OF PARIS, FRANCE.

WHEEL FOR ROAD-VEHICLES.

SPECIFICATION forming part of Letters Patent No. 685,174, dated October 22, 1901.

Application filed March 5, 1901. Serial No. 49,761. (No model.)

*To all whom it may concern:*

Be it known that I, CHARLES RENARD, clockmaker, of 33 Rue Cambon, in the city of Paris, Republic of France, have invented Improvements in Wheels for Road-Vehicles, of which the following is a full, clear, and exact description.

This invention relates to an improved wheel-felly provided with a detachable rim, and is chiefly applicable to the fellies of the wheels of vehicles having pneumatic tires.

My invention is principally characterized by the combination, with circular channels formed in the felly, of one, two, or more wires arranged in such a manner as to permit one of the edges of the felly to be withdrawn for the purpose of quickly and easily detaching the tire.

In the accompanying drawings I have shown as an example only the arrangement which forms the subject of my invention.

Figure 1:
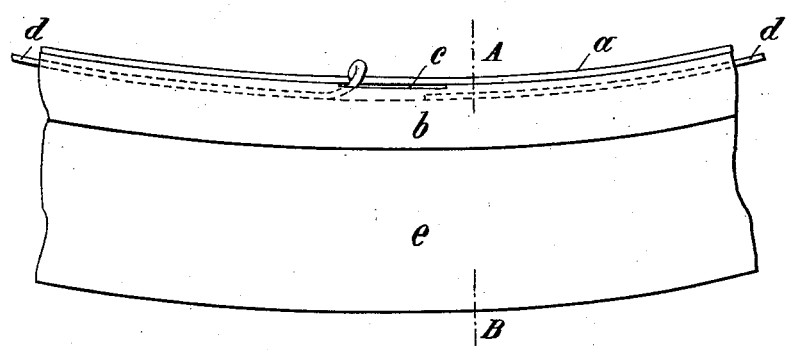
Figure 2:
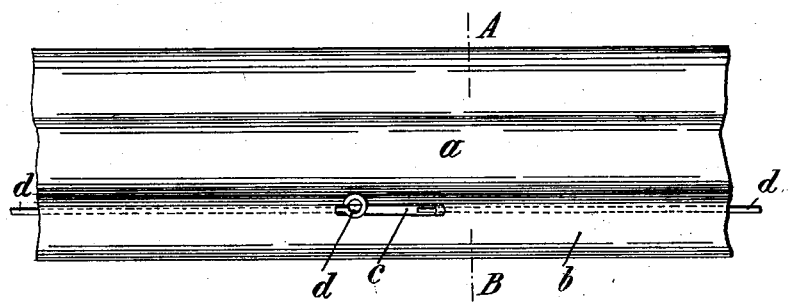
Figure 3:
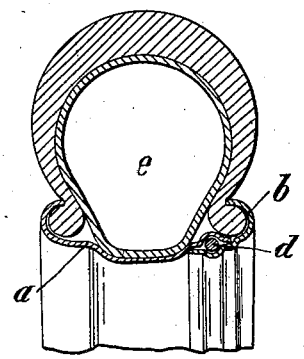
Figure 4:
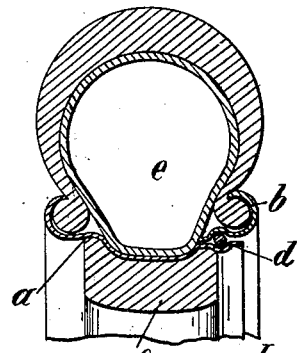

In the drawings, Figure 1 shows in elevation a portion of my improved felly as applied to a metallic wheel—for example, a velocipede-wheel. Fig. 2 is a plan view corresponding to Fig. 1. Fig. 3 is a transverse section taken on the line A B, Figs. 1 and 2. Fig. 4 shows in transverse section my improved felly as applied to a wooden wheel.

Like letters of reference indicate corresponding parts throughout the drawings.

As shown in Figs. 1, 2, and 3, my improved wheel-felly comprises, in principal, the "felly," properly so called, $a$, provided near one of its edges with an annular channel which registers with another corresponding annular channel formed in the rim $b$ of this felly. In the rim $b$ is arranged one, two, or more apertures $c$ for the passage of one, two, or more wires $d$.

The mounting of the pneumatic tire $e$ upon the felly is accomplished in the following manner: The tire $e$ is placed upon the felly $a$, and the rim $b$ is then put in place. Afterward one end of the wire $d$ is introduced through the appropriate aperture into the circular channel. By then turning either the felly or the rim the wire is led into the channel until its foremost end is almost reëxposed—that is to say, until the wire $d$ is completely lodged in the circular channel. The assembling of the parts being effected as hereinbefore set forth, if a lateral tractive force is applied either to the felly or to the rim it is impossible to separate these two parts by reason of the resistance or locking afforded by the wire in the channel. If it is desired to remove the pneumatic tire, it is only necessary to turn one of these parts—*i. e.*, the felly or the rim—in the contrary direction to that in which it was formerly turned. This movement is transmitted to the wire, which passes out of its aperture, and after it has been withdrawn the rim can be taken away and the pneumatic tire removed.

It will be understood from the preceding that the mounting and detaching of the felly can be rapidly and easily effected.

When my improved felly is applied to a wooden wheel $f$—as shown, for example, in Fig. 4—the rim $b$ instead of being applied upon the inside of the felly, as in the arrangement previously described, is applied to the outside in order to facilitate its mounting and removal.

It is well understood that the improved felly which I have described can carry one or two detachable rims and can be provided with one, two, or more annular channels in which one, two, or more corresponding wires can be lodged.

I can, if desired, vary the forms, dimensions, details, and materials employed in the construction of my improved felly without departing from the nature of my said invention.

I claim—

1. An improved wheel-felly, provided with a detachable rim for wheels of vehicles having pneumatic tires, characterized by the arrangement of annular channels formed in any number in the felly $a$ and in the rim $b$ at the bearing-points, such channels being kept in relation by means of wires $d$, so that the parts $a$ and $b$ can only be separated after the removal of the wires $d$.

2. A wheel having its rim formed in two annular parts arranged jointly to hold the tire and formed with annular matching grooves or channels, one of said parts being provided with an aperture leading to the grooves, and a flexible annular locking device adapted to be introduced through said aperture into the said matching grooves, to hold said parts of the rim together.

3. A wheel having its rim formed in two annular parts arranged jointly to hold the tire, one of said parts being larger than the other and the parts overlapping at their inner edges, the parts being formed with annular registering grooves or channels at the overlapping portions, and a locking device engaging the channels and serving removably to hold said parts of the rim together.

The foregoing specification of my improvements in wheels for road-vehicles signed by me this 16th day of February, 1901.

CHARLES RENARD.

Witnesses:
EDWARD P. MACLEAN,
MAURICE H. PIGNET.